United States Patent [19]

Wrathall

[11] 4,231,332
[45] Nov. 4, 1980

[54] SPARK AND DWELL IGNITION CONTROL SYSTEM USING DIGITAL CIRCUITRY

[75] Inventor: Robert S. Wrathall, Tempe, Ariz.

[73] Assignee: Motorola, Inc., Schaumburg, Ill.

[21] Appl. No.: 49,016

[22] Filed: Jun. 15, 1979

[51] Int. Cl.³ .............................................. F02P 5/04
[52] U.S. Cl. ............................ 123/416; 123/117 R; 123/609
[58] Field of Search ............ 123/117 D, 117 R, 148 E

[56] References Cited

U.S. PATENT DOCUMENTS

| | | | |
|---|---|---|---|
| 4,009,699 | 3/1977 | Hetzler et al. | 123/117 D |
| 4,018,197 | 4/1977 | Salway | 123/117 D |
| 4,018,202 | 4/1977 | Gartner | 123/148 E |
| 4,104,997 | 8/1978 | Padgitt | 123/117 R |
| 4,114,573 | 9/1978 | Mori | 123/117 D |
| 4,119,069 | 10/1978 | Perrin | 123/117 D |
| 4,127,092 | 11/1978 | Fresow et al. | 123/117 D |
| 4,169,438 | 10/1979 | Iwafe et al. | 123/117 R |
| 4,174,688 | 11/1979 | Hönig et al. | 123/148 E |

FOREIGN PATENT DOCUMENTS 2006988  5/1979  United Kingdom ................ 123/117 D

*Primary Examiner*—Charles J. Myhre
*Assistant Examiner*—Raymond A. Nelli
*Attorney, Agent, or Firm*—Phillip H. Melamed; James W. Gillman

[57] ABSTRACT

A digital spark and dwell ignition control system is disclosed. Maximum advance and reference sensors are utilized to determine positions of maximum and minimum possible advance for spark ignition with respect to the position of the engine crankshaft. For each maximum advance sensor pulse a main counter starts sequentially counting clock pulses wherein the maximum count obtained by the counter is related to engine crankshaft speed. The count of the main counter is utilized by a dwell circuit to determine the time prior to the maximum advance pulse at which spark coil excitation should occur. The main counter count also determines several inputs to a read only memory (ROM) circuit whose output controls a rate multiplier. The rate multiplier receives input clock signals and provides selective frequency division for these clock signals in accordance with the ROM output. The output of the rate multiplier is coupled to an accumulator means, preferably a series of counters, which provides an accumulated count corresponding to the rate multiplier output. The accumulated count is utilized to determine the occurrence of spark ignition. Pulse width modulation circuitry receives an analog signal related to the amount of sensed engine vacuum pressure and produces a corresponding periodic digital two state signal which has a duty cycle related to the magnitude of the analog vacuum signal. The periodic two state digital signal is coupled as an input to the ROM which controls the rate multiplier means. In this manner the accumulator count is made to depend upon the magnitude of the analog vacuum signal while a minimum amount of ROM storage space is utilized.

15 Claims, 12 Drawing Figures

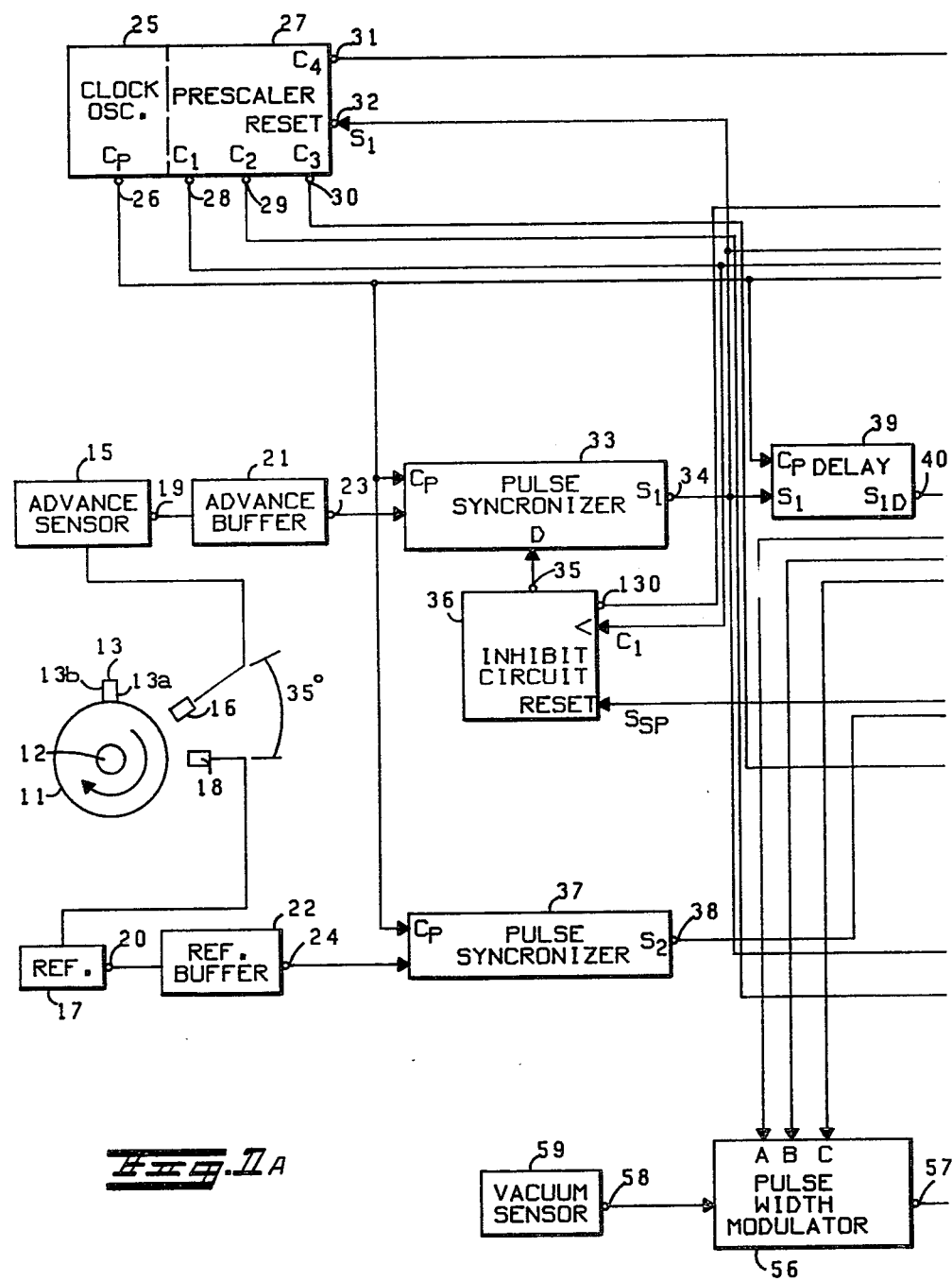
FIG. IIA

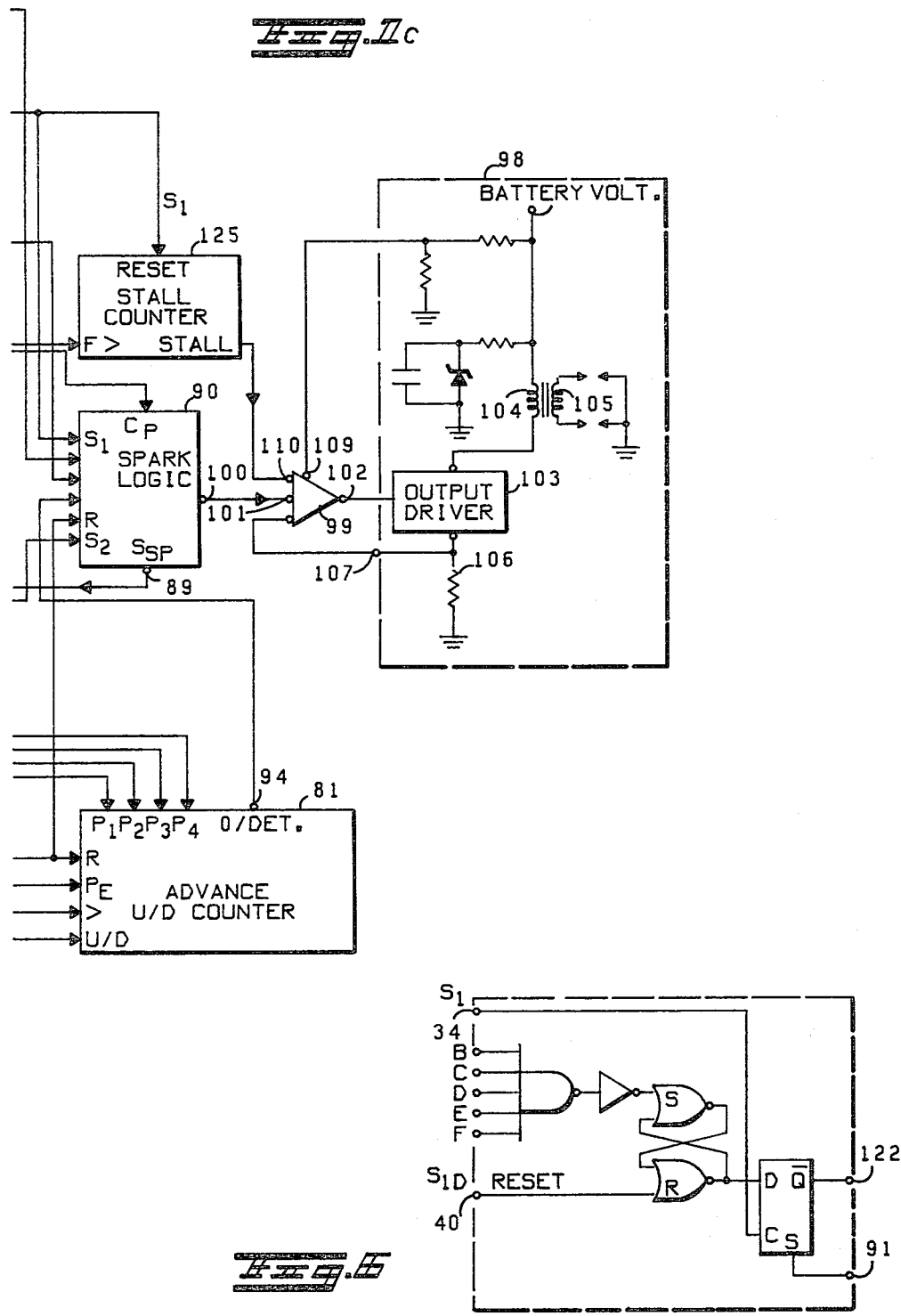

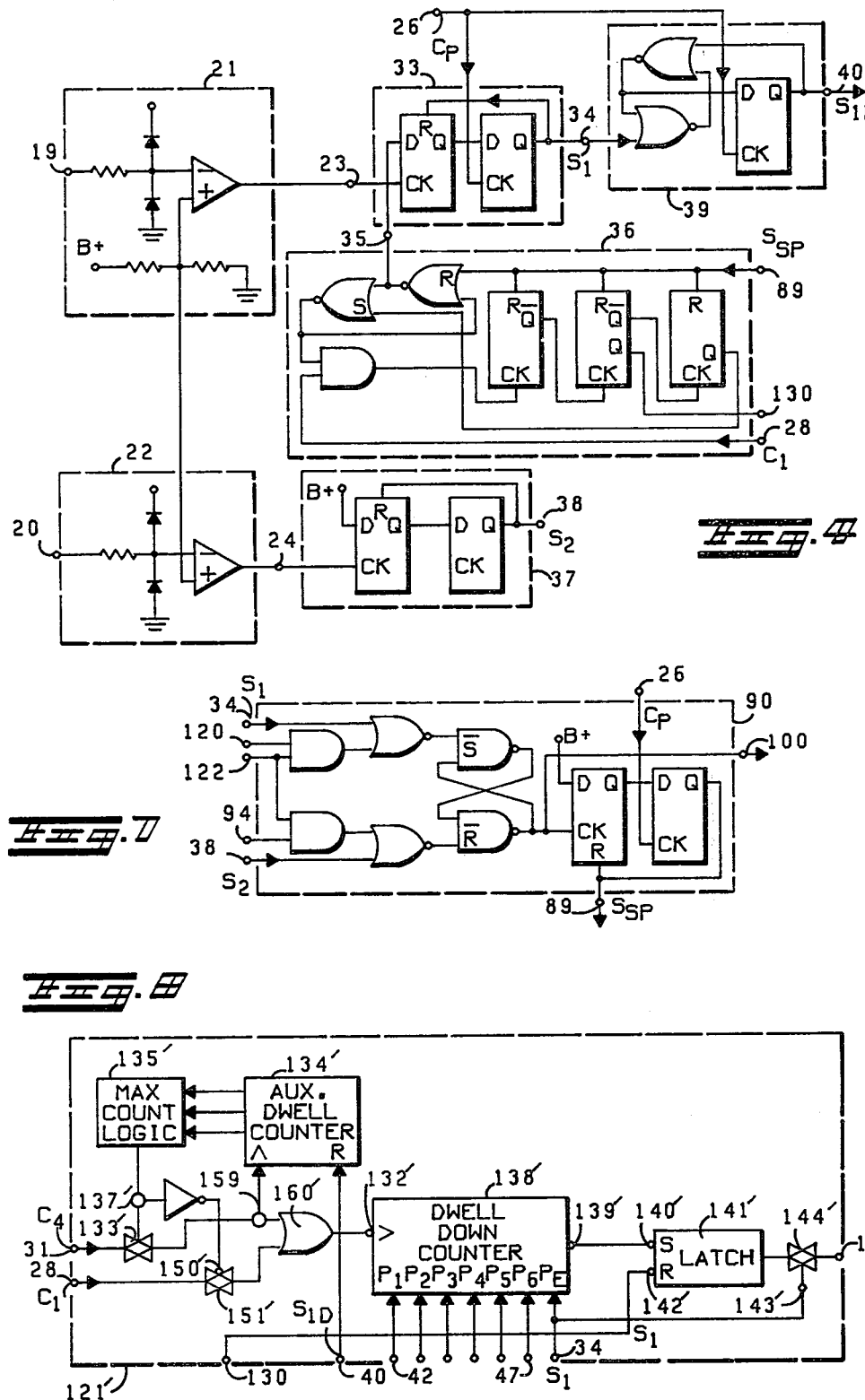

SPARK AND DWELL IGNITION CONTROL SYSTEM USING DIGITAL CIRCUITRY

CROSS REFERENCE TO RELATED APPLICATIONS

The present invention is related to the inventions described and claimed in copending U.S. patent application Ser. No. 49,013, filed June 15, 1979 entitled "Dwell Circuitry for an Ignition Control System" by Rupin J. Javeri; and described and claimed in copending U.S. patent application Ser. No. 49,014, filed June 15, 1979 entitled "Improved Digital Dwell Circuit" by Adelore Petrie. Both of the copending U.S. applications referred to above are assigned to the same assignee as the present invention.

BACKGROUND OF THE INVENTION

The present invention relates generally to the field of digital signal processing circuitry, and more particularly to the field of electronic ignition control systems which utilize digital signal processing circuitry for controlling spark and dwell occurrence.

In internal combustion engines the time occurrence at which a spark is produced to ignite a fuel and air mixture in a cylinder is a primary operational consideration. Similarly, producing an appropriate excitation signal (dwell) for an ignition coil immediately prior to the coil producing spark ignition is also a major design consideration. Mechanical spark control ignition systems have been found not to be reliable over long periods of time thus necessitating frequent readjustment of the mechanical controls. Thus electronic spark control ignition systems having greater reliability have been developed.

The majority of the prior art electronic spark timing control systems have been analog systems since those systems are typically more readily implemented with standard components. One such analog ignition control system is illustrated in U.S. Pat. No. 4,104,997, assigned to the same assignee as the present invention. In this analog electronic spark ignition control system, it is pointed out how controlling the rates of increase and decrease of an analog signal, which charges and discharges a capacitor, can result in producing a desired spark timing versus engine speed characteristic for an engine utilizing a distributorless ignition system. The term "distributorless" is utilized to indicate that the occurrence of spark ignition in different cylinders is not dependent upon the mechanical position of a standard distributor which channels spark energy to appropriate cylinders, but that spark ignition for each of the cylinders is determined by electronic switching circuitry.

The analog spark control system referred to above has the disadvantage that in accurately controlling the charge and discharge slopes of a capacitor in order to accurately determine spark timing, a number of precise individual settings of analog controls must be accomplished. This adds to the complexity and cost of the analog spark timing control system.

Digital spark control systems are known, and one such digital system is illustrated in copending U.S. patent application Ser. No. 779,974 filed Mar. 22, 1977 and entitled "An Electronic Ignition Timing System Using Digital Rate Multiplication", assigned to the same assignee as the present invention, now U.S. Pat. No. 4,168,682. This digital ignition control system illustrates how digital circuitry including a binary rate multiplier, a read only memory (ROM) which supplies control signals to the binary rate multiplier and an accumulator which receives the output of the binary rate multiplier can be utilized to accurately determine ignition spark timing through the use of digital circuitry. This copending application utilizes the output of the ROM to totally control the rate multiplication of a rate multiplier solely as a function the input of the rate multiplier. Other engine variables such as engine vacuum pressure and engine temperature are utilized to produce different pulse trains which serve as inputs to the rate multiplier and therefore affect the inputs and outputs of the read only memory circuit. The effect of this is that a rather large read only memory circuit is required for the prior art engine control system illustrated in the copending application. The advantage of the copending application is that it requires a substantially smaller read only memory than previous digital engine control systems such as those shown in U.S. Pat. Nos. 3,738,339 and 3,749,073, both of which require extremely large read only memories since both contemplate using ROMs to perform a point by point table look up function in order to produce a desired non-linear spark timing control signal or count which determines the desired engine speed versus spark advance characteristic. The prior copending application minimizes the size of read only memories utilized in ignition control systems by implementing piece wise linear accumulation rates for a pulse accumulator wherein the aggregate count is a complex function of engine speed and other engine variables. The present invention provides improved circuitry for reducing the size of the read only memory still further while producing an aggregate count related to several engine variables including engine speed and engine vacuum pressure.

Electronic dwell circuits for ignition control systems are known and U.S. Pat. Nos. 3,908,616 and 4,018,202 illustrate digital circuits for determining a dwell control signal. While the circuits shown in these patents evidently produce accurate digital dwell control signals, generally they are not economically adaptable to operate in conjunction with digital spark timing circuits in which the spark timing is to be a function of engine speed and other additional engine variables. Some prior dwell circuits (e.g. U.S. Pat. No. 3,908,616) cannot produce large dwell angles required at high engine speeds. Other prior dwell circuits such as U.S. Pat. No. 4,018,202 require complex feedback circuits having marginal stability.

Digital signal processing circuits exist which utilize a rate multiplier which is followed by an accumulator wherein the signal modification provided by the rate multiplier is controlled by a control means. In order to accomplish this signal modification in accordance with an analog signal, these prior art circuits convert each analog signal magnitude into a corresponding fixed digital word which serves as the input to a read only memory whose output serves as the control for the rate multiplier. If the output of the rate multiplier is desired to vary as the analog signal varies slightly in its magnitude (thus requiring high resolution analog to digital conversions), then an extremely large capacity read only memory device must be utilized since a different digital output from the read only memory must be produced in accordance with each minor analog signal magnitude variation for which a ROM output change is desired. The present invention minimizes the size of a read only memory in the above described processing circuit while permitting an extremely high resolution analog to ROM digital output conversion to be implemented. The manner in which this is accomplished is described in the remaining portions of this document.

SUMMARY OF THE INVENTION

An object of the present invention is to provide an improved and simplified digital signal processing circuit for providing a high resolution analog to digital conversion.

A more particular object of the present invention is to provide an improved and simplified electronic ignition control system for an internal combustion engine which utilizes digital signal processing circuitry.

A further object of the present invention is to provide both an improved signal processing circuit and an electronic ignition control system which utilizes such an improved circuit in which the size of the memory capacity of a read only memory circuit is minimized while an accurate high resolution analog to digital conversion result is produced.

In one embodiment of the present invention an improved digital signal processing circuit is provided.

The circuit comprises: clock means for producing an input signal comprising a series of digital pulses having a predetermined rate of occurrence; rate multiplier means coupled to said clock means for receiving said input signal and producing a corresponding output signal by selectively multiplying (dividing) the rate occurrence of the input signal pulses in accordance with received control signals; control means coupled to said rate multiplier means for producing and supplying said control signals for controlling the rate multiplication of said rate multiplier means, said control means comprising a read only memory means (ROM) with the output of the ROM determining said control signals; accumulator means coupled to said rate multiplier means for receiving said output signal and accumulating a count related to the pulse count of said output signal; wherein te improvement comprises said control means including pulse width modulation means for receiving an analog signal and producing a periodic digital two state signal having a duty cycle related to the magnitude of the analog signal, and means coupling the digital two state signal as an input to said ROM, in addition to other inputs received by said ROM.

The above recited structure insures that the output of the ROM is not only a function of the other inputs received by said ROM, but now the output of the ROM is also a function of the magnitude of an analog signal. The above structure causes the rate of occurrence of pulses in the output signal of the rate multiplier to be a function of the magnitude of the analog signal, and this allows high resolution in converting the analog signal to a digital pulse count while minimizing the memory storage required by the ROM in order to implement this function.

Essentially the present invention contemplates applying a duty cycle controlled two state signal as an input signal to a read only memory which controls the multiplication of a rate multiplier whose output is effectively accumulated by a subsequent accumulator. The present invention, by providing for periodically switching the control signals to the rate multiplier in accordance with a duty cycle controlled by an analog signal magnitude, results in the accumulator obtaining an accumulated digital count related to the precise magnitude of the analog signal. The read only memory device need only store two different control signals each one corresponding to the analog signal having either a predetermined maximum or minimum magnitude. When the analog signal is anywhere in between these maximum and minimum limits, the pulse width modulation means produces the periodic two state signal with its duty cycle directly related to the magnitude of the analog signal. This results in periodically switching the ROM produced control signals received by the rate multiplier means such that over a period of time the output pulse count accumulated by the accumulator means will be directly related to the magnitude of the analog signal wherein this is accomplished by switching between the maximum and minimum control outputs of the read only memory for different time durations determined by the duty cycle of the periodic digital output signal of the pulse width modulation means. In other words the present invention allows continuous interpolation between two possible rate multiplier control outputs of a read only memory by controlling the duty cycle of a two state input signal to the read only memory and producing an accumulated signal related to the ROM control outputs.

The present invention contemplates utilizing the digital signal processing circuitry described above in an electronic ignition control system. It is contemplated that the accumulator will be reset in response to sensed engine crankshaft position pulses and that the count which is accumulated by the accumulator means will determine the time occurrence of engine ignition (spark). It is contemplated that engine vacuum pressure will be sensed and provide an analog signal related thereto which will result in providing the periodic two state output signal of the pulse width modulation means wherein the duty cycle of the periodic output signal is determined by the magnitude of the vacuum analog signal. It is contemplated that engine speed will be utilized to determine other input signals being applied to the read only memory device while the periodic output of the pulse width modulation means is also coupled as an input to the ROM.

In addition, it is contemplated that two engine crankshaft position sensors will be utilized to produce pulses wherein one of the sensors (advance) will define the earliest time (for a cycle of cylinder compression) at which spark ignition should occur and the other sensor (reference) will define the latest time at which spark ignition should occur (for any one engine cylinder). It is contemplated that these sensor pulses will also be utilized, by control circuitry, such that spark dwell will be initiated no later than the earliest possible occurrence of spark ignition and that a spark will be generated no later than the latest possible time for generating a spark. The two engine position sensor pulses produced by the sensors are contemplated as determining the timing pulses for spark ignition and dwell through the use of the above recited digital circuitry and other additional digital circuitry.

BRIEF DESCRIPTION OF THE DRAWINGS

For a more complete understanding of the invention, reference should be made to the drawings, in which:

FIG. 4 is a schematic diagram illustrating typical circuit configurations for several of the block components shown in FIG. 1;

FIG. 6 is a schematic diagram illustrating a typical configuration for a slow speed decoder shown in FIG. 1;

FIG. 7 is a schematic diagram illustrating a typical configuration for a spark logic circuit shown in FIG. 1;

FIG. 8 is a schematic diagram of another typical embodiment for a dwell circuit shown in FIG. 1;

DESCRIPTION OF THE PREFERRED EMBODIMENTS

Figure 1B:
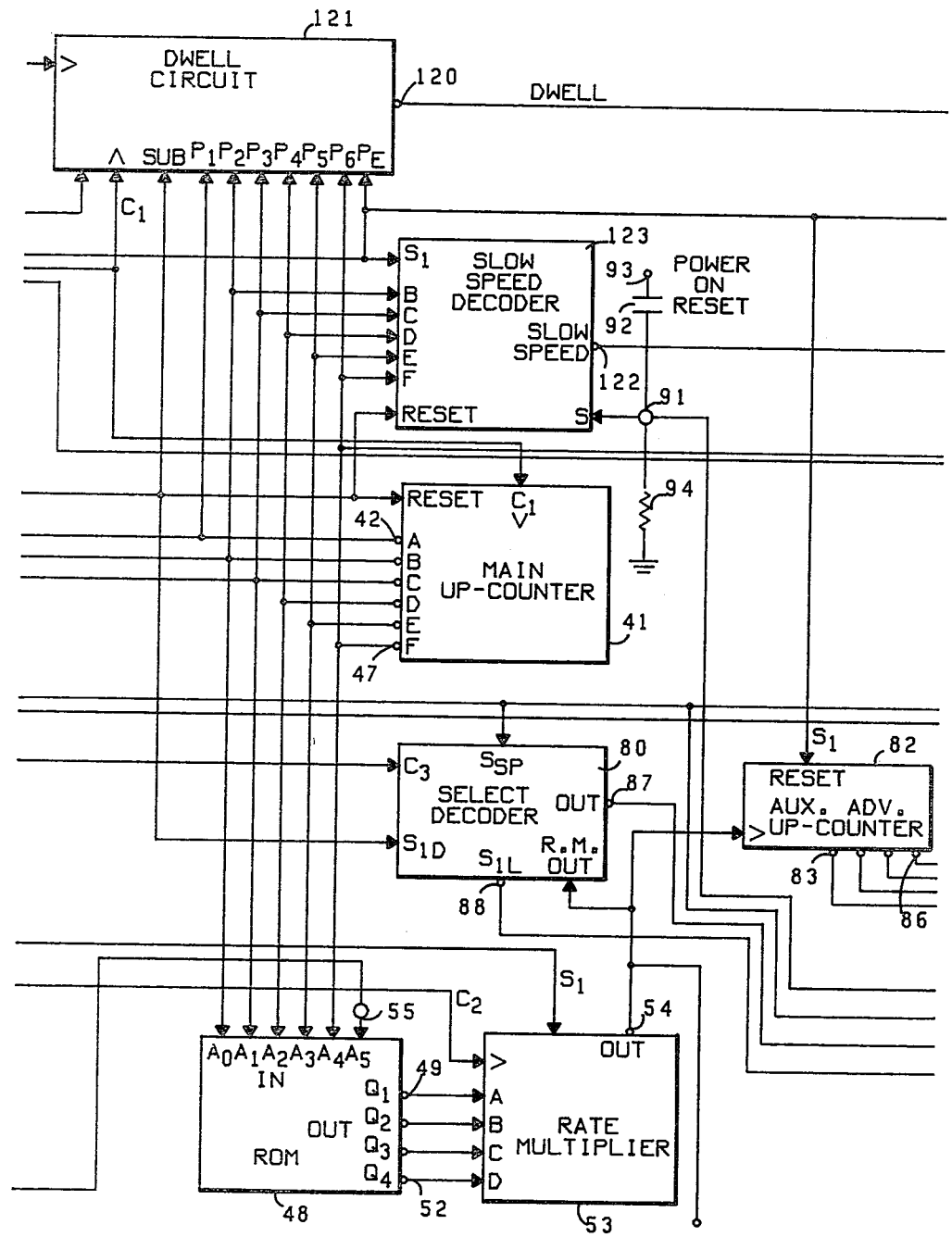
FIG. 1, comprising drawings 1A, 1B and 1C, is a combination block and schematic diagram illustrating an engine ignition control system for an internal combustion engine.

FIG. 1 illustrates an electronic ignition control system 10 for a two cylinder internal combustion engine (not shown). Essentially the control system 10 receives sensor input signals and develops control signals that determine the spark timing and dwell (coil excitation time) for a distributorless inductive ignition system. The term "distributorless" contemplates the fact that no rotating mechanical distributor will be utilized, and that instead sparks will be created in each of the two cylinders simultaneously but at different times with respect to the compression cycle of each cylinder. In other words, when a spark is generated for cylinder 1 at the proper time of its compression cycle, a spark will also be generated in cylinder 2 but this spark will occur during the exhaust cycle of cylinder two and therefore will not result in igniting a fuel mixture. Distributorless ignition systems are known and do not form an essential part of the present invention.

The control system 10 illustrated in FIG. 1 will now be described. For a better understanding of FIG. 1, drawings 1A, 1B and 1C should be arranged with drawing 1B located between drawings 1A and 1C.

The control system 10 includes a rotating cam 11 synchronously rotatable with a crankshaft of a two cylinder engine, the crankshaft being shown schematically as an axis of rotation 12. The cam 11 has a peripheral projection 13 spaced from the axis 12 and the cam 11 is cntemplated as rotating in a clockwise direction.

An advance sensor 15 is contemplated as having a sensing probe 16 positioned at a fixed location with respect to the rotating cam 11, and a reference sensor 17 is contemplated as having a sensing probe 18 similarly positioned with the probes 16 and 18 being spaced apart by 35 degrees of angular rotation of the cam 11 (which corresponds to 35 degrees of engine crankshaft rotation). The probes 16 and 18 produce crankshaft angular position pulses as the projection 13 rotates by these probes with the produced position sensing pulses initially occurring in response to the passage of a leading edge 13a of the projection passing by the sensing probes and the position pulses terminating after a trailing edge 13b has passed by the probes 16 and 18. The advance sensors 15 and 17 receive input signals from their corresponding sensing probes and produce digital pulse outputs in correspondence thereto at output terminals 19 and 20, respectively.

It should be noted that the positioning of the sensing probes 16 and 18 with respect to the rotating cam 11 and its projection 13 is not totally arbitrary and that it is contemplated that the probe 16 is positioned such that it defines the maximum possible advance (earliest possible spark ignition occurrence for a cylinder compression cycle) for the ignition system 10 while the probe 18 defines the minimum possible advance (generally corresponding to top dead center of cylinder position which is generally termed zero or reference advance). Thus the positioning of the probe 16 and 18 define the earliest and latest possible occurrences of spark ignition, respectively, for the ignition control system 10. The significance of this will be demonstrated subsequently.

Figure 9:
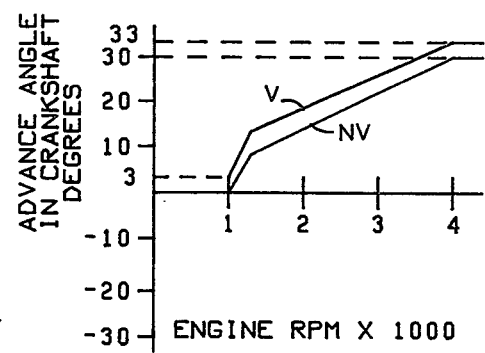
FIG. 9 is a graph which shows the desired spark timing versus engine speed characteristic provided by the circuit in FIG. 1.
Figure 10:
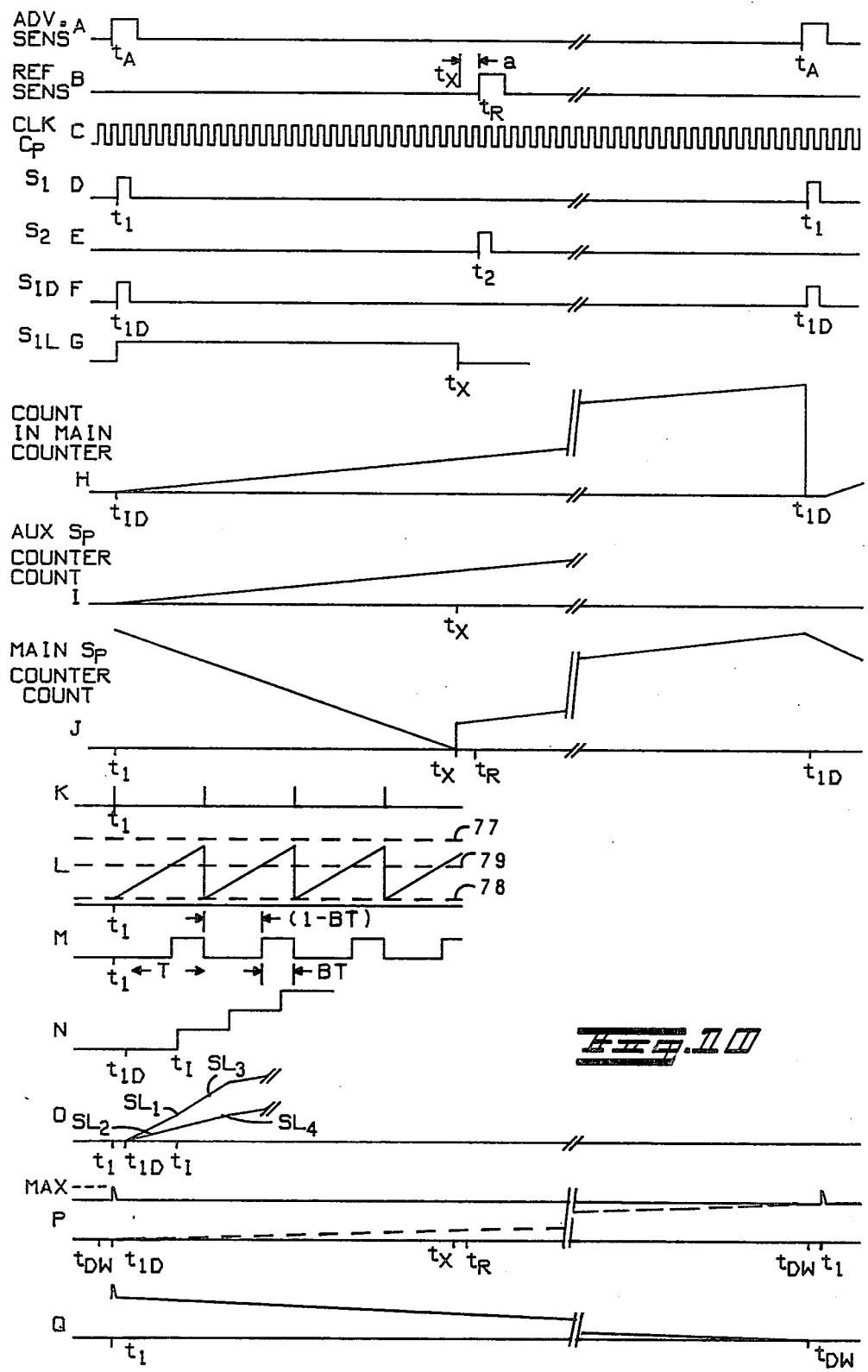
FIGS. 10A through 10Q are a series of graphs which illustrate electrical signals and pulse count accumulations as functions of time for the system shown in FIG. 1.

The advance and reference output terminals 19 and 20 are coupled as inputs to advance and reference buffers 21 and 22, respectively, which impedance isolate the sensors from subsequently circuitry and insure the production of precise, uniform magnitude corresponding digital pulses at output terminals 23 and 24, respectively. FIGS. 10A and 10B illustrate the sensing pulses produced at the terminals 23 and 24, respectively, and illustrate that these pulses occur periodically at times $t_A$ and $t_R$ corresponding to the passage of the leading edge 13a past the sensing probes 16 and 18. The time occurrences $t_A$ and $t_R$ of the pulses at the terminals 23 and 24 are utilized by the ignition control system 10 to determine spark timing and dwell, and the manner in which this is accomplished will now be discussed with reference to the circuit schematics in FIGS. 1 through 8 and the graphs in FIGS. 9 and 10A–Q. It should be noted that the horizontal axis in FIGS. 10A–Q is time and that FIGS. 10A, 10B, 10D–10J and 10P and Q are drawn having the same time axis scale, while FIGS. 10C and 10K through 10O are drawn with a greatly expanded time scale.

The control system 10 includes a master clock oscillator 25 which produces clock timing pulses $C_p$ at an output terminal 26 wherein the frequency of the clock oscillator is preferably 149.25 KHz. The clock pulses $C_p$ are illustrated schematically in FIG. 10C on a greatly expanded horizontal time scale and are continuously produced by the oscillator 25 regardless of the angular position of the crankshaft of the engine. A prescaler 27 is shown as being integral with the clock oscillator 25 and producing output signals C1 through C4 at output terminals 28 through 31, respectively. The prescaler essentially comprises a series of counters which receive the clock signal $C_p$ and produce related lower frequency signals by essentially counting and thereby frequency dividing down the oscillator signal pulses $C_p$. Such prescalers are very well known and thus the construction details of the prescaler 27 will not be discussed. The C1 signal produced at the terminal 28 has an operative frequency of 1.16 KHz, C2 has a frequency of 9.33 KHz, the frequency for C3 is 49.75 KHz and the frequency of C4 is 74.6 KHz. All of the signals $C_p$ and $C_1$–$C_4$ have repetition rates independent of the speed of crankshaft rotation. The prescaler 27 has a reset terminal 32 which causes resetting of the counters internal to the prescaler 27. The signals developed by the clock oscillator 25 and prescaler 27 at the terminals 26 and 28 through 31 essentially determine the operation of the ignition control system 10 in conjunction with the pulses sensed by the advance and reference probes 16 and 18. The signals produced at the terminals 28 through 31 are essentially used in various counters included in the ignition control system 10 and therefore the provision for resetting the internal counters in the prescaler 27 via the reset terminal 32 is required to insure that counters receiving their inputs in accordance with the signals at the terminals 28 through 31 will be synchronized with the advance sensor signal $S_1$ described below.

A pulse synchronizer 33 receives an advance signal input from the terminal 23 and the clock pulse signal $C_p$ from the terminal 26. The pulse synchronizer produces a synchronized advance pulse $S_1$ at an output terminal 34. Essentially, the synchronizer 33 insures that a pulse $S_1$ is produced at the terminal 34 at a time $t_1$ which corresponds to the first clock pulse $C_p$ that occurs after the time $t_4$. In this manner the signal $S_1$ (shown in FIG. 10D) represents an advance pulse which is synchronized with the occurrence of the clock pulses $C_p$.

The pulse synchronizer 33 also receives an input at a terminal D from an output terminal 35 of an inhibit circuit 36. Essentially the inhibit circuit 36 produces a 4 millisecond delay pulse at the terminal 35 in response to the occurrence of spark ignition and this delay or inhibit signal at the terminal 35 prevents the pulse synchronizer from producing an output at the terminal 34 for 4 milliseconds after the occurrence of spark ignition. The reason for this is to quiet the output of the synchronizer 33 such that additional sparks will not be initiated by the synchronizer 33 until at least 4 milliseconds has elapsed since the last spark occurrence. This feature is not critical to the operation of the present invention as claimed herein.

A pulse synchronizer 37 is similar to the synchronizer 33 and receives inputs from the reference sensor terminal 24 and the clock pulse terminal 26 and produces a synchronized reference pulse signal $S_2$ at an output terminal 38. The synchronizer 37 merely insures that a reference signal $S_2$ has an initial time occurrence which precisely corresponds to the occurrence of one of the clock pulses $C_p$. Since it is contemplated that the frequency of occurrence of the clock pulse $C_p$ is very high (higher than all other timing signals C1–C4), this synchronization results in substantially no loss in accuracy for the present system, due to delaying advance and reference timing by one clock pulse, but does insure that the reference pulse $S_2$, as well as the advance pulse $S_1$, will occur in synchronism with the clock pulse $C_p$. This insures synchronized timing for the control system 10. The reference signal $S_2$ is illustrated in FIG. 10E as comprising periodic pulses which occur at the times $t_2$. It should be remembered that the duration of time between the occurrence of the advance pulses $S_1$ at $t_1$ and the reference pulses $S_2$ at the times $t_2$ corresponds to 35 degrees of engine crankshaft rotation. Of course the actual time duration between $t_1$ and $t_2$ will vary directly as a function of engine speed.

A delay circuit 39 receives the signal $S_1$ along with the clock pulses CP and produces a delayed output signal $S_1D$ at an output terminal 40. Essentially, the delay circuit 39 receives the synchronized signal $S_1$, delays this signal by one full period of the clock pulse signal $C_p$ and produces this delayed signal $S_1D$ at the terminal 40. FIG. 10F illustrates this delay advance signal $S_1D$ which has a time occurrence at $t_1D$ that is one clock pulse period later than the time occurrence $t_1$. The reason for creating the delayed advance signal $S_1D$ is that in many cases the control system 10 will transfer accumulated counts at the times $t_1$ in response to the pulses $S_1$, and subsequently the accumulated counts are to be reset. Obviously the transference and resetting cannot occur simulatenously, thus the present invention provides for delaying the resetting until after transference.

The ignition control system 10 essentially utilizes a main up-counter 41 to linearly count up C1 pulses occurring at the terminal 28 in between the occurrence of delayed advance signal pulses $S_1D$. This is accomplished by having the main up-counter 41 receive its counter input from the terminal 28 while its reset terminal is directly connected to the terminal 40. The counter 41 therefore periodically linearly accumulates a count which has a maximum value directly related to engine speed since the counting occurs during the times $t_1D$ which occur every 360 degrees of crankshaft rotation.

FIG. 10H illustrates a waveform representative of the linearly incremented count of the counter 41. It should be noted that individual counting steps have not been illustrated in FIG. 10H since these steps occur at the relatively high frequency of the signal $C_1$ produced by the prescaler 27. However, FIG. 10N does illustrate the count in the main counter 41 on a very expanded hrizontal time scale, and this figure clearly illustrates the incremental nature of the accumulated count in the counter 41.

The accumulated count of counter 41 is produced at 6 output terminals 42 through 47 with terminal 42 corresponding to the least significant bit and terminal 47 corresponding to the most significant bit. Thus the main up-counter 41 represents a 6 bit binary counter. Such counters are well known and readily available. It should be noted that while the electronic ignition control system 10 utilizes the maximum accumulated count obtained by the counter 41 as an indication of engine speed, the ignition system 10 also utilizes each incremental count produced by the counter 41 at its output terminals 43 through 47 as control signal inputs to spark time occurrence circuitry within the system 10, and these incremental counts are utilized to produce a desired non-linear spark occurrence versus engine speed characteristic. The manner in which this is accomplished will now be discussed.

Each of the output terminals 43 through 47 of the main up-counter 41 are coupled as inputs to a read only memory (ROM) device 48 which has 4 output terminals 49 through 52 which are coupled as control signal inputs to a rate multiplier device 53. The rate multiplier 53 receives a continuous stream of input clock pulses C2 via a direct connection to the terminal 29 and produces a corresponding output pulse stream at an output terminal 54 in accordance with the control signals received from the terminals 49 through 52. The rate multiplier device 53 is set by the pulse $S_1$ which is received via a direct connection from the terminal 34, and this reinitiates the operation of the rate multiplier 53. The rate multiplier esentially functions as a controllable frequency divider which multiplies (actual divides) the frequency of the input pulse stream by predetermined integers which are determined by the control signals received from the ROM. Rate multipliers are well known and are readily available.

Essentially, the pulse stream produced at the output terminal 54 is subsequently accumulated in an accumulator means which develops a count related to the number of pulses produced at the terminal 54. The exact structure of the accumulator means which accomplishes this will be described subsequently. This total accumulated count, which occurs between the pulses $S_1$, is then subsequently utilized by the ignition control system 10 to determine the occurrence of spark ignition. The above described spark timing technique of utilizing a rate multiplier which is controlled by a read only memory circuit that receives incrementally controlled inputs related to engine speed (it should be remembered that in the present case the ROM inputs are the counts of the up-counter 41 which are related to engine speed) is essentially described in copending U.S. Pat. application Ser. No. 779,974, filed Mar. 22, 1977 and assigned to the same assignee as the present invention, now U.S. Pat. No. 4,168,682.

Essentially the ROM 48 functions as a table look-up device which produces different control signals at the terminals 49 through 52 that control the frequency multiplication (division) provided by the rate multiplier 53. The end result is that the output pulse count produced at the terminal 54 is a non-linear function of engine speed such that a desired spark ignition occurrence versus engine speed characteristic can be obtained. The accumulator means effectively integrates or accumulates the pulse count at the terminal 54 and determines, between $S_1$ pulses, a maximum pulse count non-linearly related to engine speed. This maximum pulse count is then utilized to determine spark ignition.

Issued U.S. Pat. No. 4,104,997 illustrates an analog system in which a desired non-linear spark occurrence versus engine speed characteristic is produced by controlling the rates of charging and discharging a capacitor. In the present invention the ROM 48 and rate multiplier 53 digitally implement an equivalent function for controlling the rate of pulses produced at the terminal 54, and an accumulator means integrates these pulses to produce the desired result. FIG. 9 illustrates the desired advance angle (spark timing occurrence) versus engine speed characteristic which is desired by issued U.S. Pat. No. 4,104,997 and which is a typical characteristic also desired by the present invention. The above referred to copending U.S. application 779,974, now U.S. Pat. No. 4,168,682, explains how the slope changes of the characteristics shown in FIG. 9 can be digitally implemented by use of a rate multiplier and ROM without having the ROM store every individual point of the composite characteristics shown in FIG. 9. It should be noted that in FIG. 9, the curve NV represents the desired spark occurrence characteristic for no vacuum being sensed by an ignition control system whereas the curve V represents the desired characteristic for a predetermined amount of vacuum being sensed by an engine control system.

The present invention contemplates providing the read only memory 48 with an additional input signal at an input terminal 55 wherein this additional signal represents the output of a pulse width modulator circuit 56 having its output terminal 57 directly connected to the terminal 55. The pulse width modulator 56 receives an analog signal at an intput terminal 58 wherein the magnitude of this analog signal is related to a predetermined engine condition, in the present case related to the magnitude of sensed engine vacuum pressure. The pulse width modulator 56 will then produce a periodic digital two state signal which has a duty cycle (ratio of one logic state to the other during one cycle period) which is related to the magnitude of this analog signal. By coupling this digital two state signal produced at the terminal 57 as an input to the read only memory, the result is that the control signals at the output terminals 49 through 52 of the ROM are now made a function of this analog signal and effectively the ROM control outputs will be switched between two different sets of outputs, one corresponding to a low digital signal at the terminal 55 and another corresponding to a high logic digital signal at the terminal 55. Since the percentage of time (duty cycle) of the logic states of the signal at the terminal 55 is controlled in response to the magnitude of the analog signal at the terminal 58, this results in having output control signals at the terminals 49 through 52 switched back and forth between two extreme values with the average of these control signals being related to the magnitude of the analog signal at the terminal 58. Since the control signals at the terminals 49 through 52 determine the rate multiplication of the rate multiplier 53, and since the output of the rate multiplier is effectively integrated by a following accumulator means, the effect of applying a pulse width modulation signal as an input at the terminal 55 of the read only memory 48 results in providing a continuous interpolation capability between the two extreme control output produced at the terminals 49 through 52 in response to the terminal 55 having a high or low logic state.

For any one set of speed dependent control inputs received from the terminals 43 through 47 of the main counter 41, the ROM 48 need only store a maximum and minimum output corresponding to whether the signal at the terminal 55 is either high or low. In the present case there maximum and minimum outputs correspond to the sensed vacuum pressure being above or below a predetermined vacuum pressure. The actual outputs produced at the terminals 49 through 52 are then made to represent a value more directly indicative of the magnitude of the analog voltage at the terminal 58 by first producing a digital two stage signal whose duty cycle varies in accordance with the analog signal magnitude and then by applying this signal to the input terminal 55.

The improved result obtained by the present invention should be contrasted with the prior art technique of providing a different digital output signal for each analog magnitude increment for which resolution of the output signal is desired. In other words, previously if you wanted a read only memory to produce different output signals in response to three different magnitudes (for example) of an analog input signal, then three memory storage spaces within the read only memory would be required wherein three different memory address inputs would address any one of the three different desired outputs. In the present invention only two input addresses and two desired outputs are required, and by pulse width modulating a digital signal so that its duty cycle is related to an analog signal magnitude, the read only memory output will be switched back and forth between these two extreme outputs such that the average output of the read only memory will represent any output value in between these two extreme outputs which are stored in the read only memory. Thus the read only memory of the present invention need only store two output limits in response to any desired engine condition and an average ROM output corresponding to any magnitude between these two output limits can be obtained merely by using a duty cycle pulse width modulated input signal to the read only memory. This permits saving an enormous amount of read only memory storage space while still enabling the output of the read only memory to have a high resolution correspondence with respect to the magnitude of the input analog signal. To obtain an equivalent resolution by any of the prior art references could not be digitally accomplished unless an extremely large read only memory capacity was utilized. The present invention minimizes the read only memory capacity and therefore implements this function with a substantial cost savings.

The operation of the pulse width modulator and the accumulator means which follows the rate multiplier 53 will now be described in detail.

The present invention contemplates an engine vacuum pressure sensor 59 supplying an analog signal to the input terminal 58 of the pulse width modulator 56. The analog signal magnitude is representative of the state of engine vacuum pressure. Terminals 42 through 44 of the main counter 41 are also received by the pulse width modulator 56 which produces an output at terminal 57.

Figure 3:
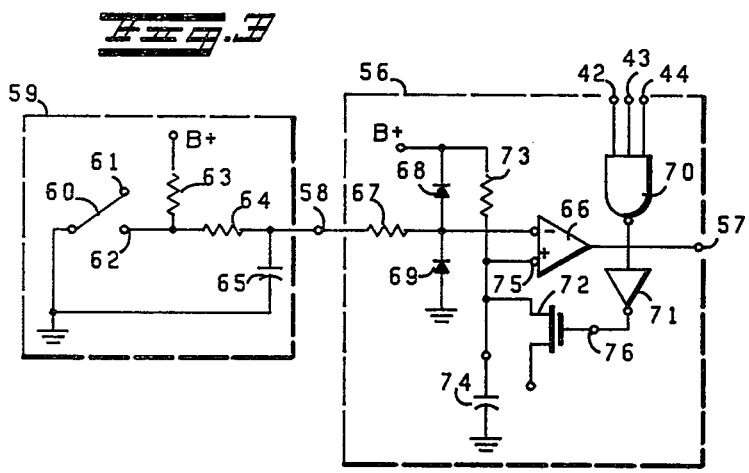
FIG. 3 is a schematic diagram illustrating a typical configuration for a pulse width modulator circuit shown in FIG. 1.

FIG. 3 illustrates typical embodiments for the vacuum sensor 59 and the pulse width modulator 56 both shown dashed in FIG. 3. The vacuum sensor 59 is contemplated as comprising a two position vacuum sensing switch 60 with a wiper arm terminal coupled to ground and the wiper varying between a first terminal 61 when sensed engine vacuum pressure is below a predetermined threshold value and a second terminal 62 when the sensed vacuum pressure is above this predetermined value. The terminal 62 is coupled to a B+ terminal through a resistor 63 and is coupled to the terminal 58 through a resistor 64. A capacitor 65 is coupled from the terminal 58 to ground. In response to sensing an engine vacuum pressure change from below to above the predetermined threshold, the switch 60 will short the terminal 62 to ground resulting in slowly changing the voltage at the terminal 58 from a high voltage to a low voltage. Preferably this voltage change occurs at a relatively slow 0.5 second time constant. Thus the signal at the terminal 58 represents an analog signal which has a magnitude related to the sensed engine vacuum pressure.

While in the present embodiment an analog signal which varies between two voltage magnitudes which directly correspond to two discrete states of vacuum pressure is illustrated, the present invention certainly contemplates other embodiments which provide an analog signal at the terminal 58 which is continuously and directly related to the instantaneous value of engine vacuum pressure rather than the opening or closing of a two position engine vacuum sensor switch.

The pulse width modulator circuit 56 comprises a DC level comparator 66 having a negative input terminal coupled to the input terminal 58 through a resistor 67. Limiting diodes 68 and 69 are also connected to the negative input terminal of the comparator 66 and essentially limit the signals received by the comparator to magnitudes either one diode drop above B+ or one diode drop below ground. The terminals 42 through 44 are received as inputs to a NAND gate 70 whose output is coupled through an inverter 71 to a control terminal 76 of an FET gate 72. An output terminal of the gate 72 is coupled to a positive input terminal 75 of the comparator 66 which is also coupled to B+ through a resistor 73 and to ground through a capacitor 74. The output of the comparator 66 is directly coupled to the output terminal 57 of the pulse width modulator 56.

Essentially the signals at the terminals 42 through 44 are converted by the NAND gate 70 into a relatively slow periodically occurring pulse signal which is used as the control signal for the FET gate 72. This control signal is illustrated in FIG. 10K. In response to each periodic pulse produced at the control gate of the FET 72, the positive input terminal (terminal 75) of the comparator 66 is shorted to a positive reference voltage just above ground potential by the gate 72. After setting the terminal 75 to just above ground, the FET gate 72 is open circuited until the next occurrence of a control pulse at its control terminal 76. FIG. 10K illustrates the control signals at the terminal 76 and FIG. 10L illustrates the signal waveforms produced in response thereto at the positive input terminal 75 of the comparator 66. Superimposed on the waveform shown in FIG. 10L is a high first dashed voltage level 77 corresponding to low vacuum pressure is being sensed by the sensor 59, a low second voltage level 78 corresponding to the low voltage eventually produced at the terminal 58 upon closure of the switch 60 in response to a high vacuum pressure being sensed, and an interim voltage level 79 corresponding to the voltage at the terminal 58 which would occur at some time after the closure of the switch 60 but before the attainment of the limit level 78. It should be noted that the waveforms in FIGS. 10K and 10L are all commenced at the times $t_1$, and that the horizontal time axes in FIGS. 10K through 10O are shown with greatly expanded time scales as compared with the other graphs in FIGS. 10A–10Q. The time scales for graphs 10K–10M are identical, but the time scales for graphs 10N and 10O are even more expanded.

FIG. 10M shows the output signal of the comparator 66 produced in response to the signal shown in FIG. 10L being created at the positive input terminal 75 while the negative terminal of the comparator 66 receives a transitional voltage corresponding to the dashed level 79 shown in FIG. 10L. FIG. 10M illustrates that the output of the comparator 66 is a digital two state logic signal in which the duty cycle of this signal varies in accordance with the magnitude of the analog signal produced at the terminal 58. For a no vacuum condition corresponding to the level 77 present at the negative input terminal of the comparator 66, the output of the comparator 66 would remain at zero, and for a voltage at the negative input terminal corresponding to the level 78, the output of the comparator 66 would always be high.

FIG. 10M illustrates that for interim values of vacuum (in the case of a continuous analog sensor being used instead of a two position vacuum sensing switch) or in the case of a slowly changing signal representing changing from vacuum to non-vacuum and back again (when a two position vacuum sensing switch is used), an analog signal is produced at the terminal 58 which results in a varying duty cycle signal being produced as the output of the comparator 66. As was previously discussed, applying this varying duty cycle signal to the input of the ROM 48 allows the output of the ROM to vary, in a periodic step wise manner, between two maximum limits and this produces an output whose average value will be directly related to the magnitude of the analog signal at the terminal 58.

In the present situation, it was found that rapidly switching from a vacuum spark advance determination to a no vacuum spark determination would disrupt the operation of the ignition control system 10. Thus it was necessary to slowly implement the change between vacuum and non-vacuum spark calculations by the system 10. In order to accomplish this, the output of the ROM 48 must be able to represent interim output values between the vacuum and no vacuum conditions corresponding to the levels 78 and 77, respectively. The present invention accomplishes this desired result without any increase in the storage space required by the ROM 48.

As was previously mentioned, an accumulator means essentially follows the rate multiplier 53 and effectively converts the pulse count at the terminal 54 into an integrated or accumulated maximum count. It is this accumulation step that results in effectively averaging the different control signal outputs produced at the ROM output terminals 49 and 52 by use of the pulse width modulator 56 altering the duty cycle of the input ROM control signal at the terminal 55.

Before describing the accumulator means coupled to the rate multiplier output terminal 54, a better understanding of the present invention will be obtained by referring to FIGS. 10N and 10O. FIG. 10N represents the incremental count, incrementing at twice the frequency of the clock pulse signal C1, commenced at the times $t_1D$ by the main up-counter 41 on the control terminals 43 through 47 coupled to the ROM 48. After the main counter 41 receives two C1 pulses the count of the main counter, as recorded on the output terminals 43 through 47, is incremented one count. In FIG. 10N the horizontal axis represents an expanded time scale whereas the vertical axis represents the stepped count stored by the terminals 43 through 47. FIG. 10O represents maximum and minimum rates of increase $SL_1$ and $SL_2$ determined by the output terminals 49 through 52 of the read only memory 48. At a subsequent time $t_I$, the count of the main counter is incremented by counting C1 pulses such that terminal 43 now indicates a new count as an input signal to the read only memory 48. Thus a different input control signal is now received by the read only memory 48 and the output terminals 49 through 52 of the ROM now are able to implement different rates of increase $SL_3$ and $SL_4$. The rates of increase $SL_1$–$SL_4$ represent different fixed integers used by the rate multiplier for frequency division.

For each different count increment on lines 43-47 the ROM 48 can select either of two different rates of increase for the count processed by the rate multiplier 53 because for any main count received as an input by the ROM 48 from the counter 41, either a zero or one logic state can be produced by the pulse width modulator 56 at the input terminal 55. FIG. 10O illustrates the different characteristics for rates of pulse count increase at terminal 54 that can be implemented by the rate multiplier 53 in accordance with the control input signals received by the read only memory 48 which supplies control inputs to the rate multiplier. By applying a pulse width modulation signal to the input terminal 55, the present invention contemplates selectively switching between maximum rates of increase such as $SL_1$ and $SL_3$ and minimum rates of increase such as $SL_2$ and $SL_4$ during the times $t_1D$–$t_I$, respectively, to obtain a composite (average) rate of increase which can be anywhere within the limits defined by the maximum and minimum rates of increase.

The previously referred to copending U.S. patent application Ser. No. 779,974, filed, Mar. 22, 1977, now U.S. Pat. No. 4,168,682, points out how controlling ROM and rate multiplier in accordance with pulse counts related to engine speed can result in determining break points for the composite spark timing advance versus engine speed characteristics illustrated in FIG. 9. Issued U.S. Pat. No. 4,104,997 demonstrates how controlling the rate of increase of an effective integrater means can be utilized to accurately determine desired spark timing relationships as a function of engine speed. The present invention combines these two techniques along with providing for pulse width modulation of an input to a read only memory in accordance with sensed engine vacuum pressure in order to minimize the ROM storage space required by an ignition spark timing control system responsive to engine speed and engine vacuum pressure.

From FIGS. 10N and 10O, which are drawn with identical horizontal time scales, it would appear that for optimum interpolation between the maximum and minimum slopes, such as $SL_1$ and $SL_2$, a pulse width modulation frequency for the signal shown in FIG. 10M as high as possible should be selected. In the preferred embodiment, this is not the case since the period of the signal in FIG. 10M is equivalent to eight main counter increments (at the frequency of C1) while the period of the signal in FIG. 10N is equivalent to two main counter increments. This relationship was decided upon in order to permit the rate multiplier to pass enough of the divided down C2 pulses to the output terminal 54 to obtain an adequate number of pulse counts at terminal 54 which represents any of the rates $SL_1$–$SL_4$.

The structure of the effective pulse count accumulator means connected to the output terminal 54 of the rate multiplier 53 will now be described.

The output of the rate multiplier 53 at the output terminal 54 is effectively coupled to an accumulator means which accumulates a count related to the total pulse count produced at the output terminal 54. This accumulator means essentially comprises a select decoder 80, a main advance up-down counter 81 and an auxiliary advance up counter 82. The rate multiplier output terminal 54 is coupled as an input to both the select decoder 80 and a count terminal ($>$) of the auxiliary advance up counter 82. The auxiliary advance up counter 82 receives a reset signal by means of a direct connection to the terminal 34 at which the $S_1$ pulses are produced. The up counter 82 is a four bit binary counter and produces count outputs at terminals 83 through 86 which are coupled as inputs to preset terminals $P_1$ through $P_4$ of the main advance up-down counter 81. The select decoder 80 receives three inputs in addition to the input from the rate multiplier output terminal 54 and produces a main output at a pulse terminal 87 and a latched advance output signal $S_1L$ at a terminal 88. The select decoder 80 receives the delayed advance pulses $S_1D$ by means of a direct connection to the terminal 40, and the decoder also receives the pulses $C_3$ from a direct input connection to the terminal 30. In addition, the select decoder 80 also receives an input signal termed $SS_p$ from a spark logic circuit 90. The signal $SS_p$ is a signal produced by the spark logic circuit 90 at the desired time occurrence $t_x$ of spark ignition and this signal is very short in duration (one period of the high frequency clock pulse signal $C_p$). The manner in which the spark logic circuit 90 creates the signal $SS_p$ will be subsequently discussed. For the time being it is sufficient to note that this signal occurs at times $t_x$ which represents the time at which spark ignition will occur according to the ignition control system 10.

It should be noted that at the output terminal 88 of the select decoder 80 the latched output signal $S_1L$ produced at this terminal is initiated in response to the delayed advance signal $S_1D$ and is terminated at the time $t_x$. The output produced by the select decoder 80 at the main output terminal 87 essentially comprises the pulse signal $C_3$ during the pulses $S_1D$ (occurring at the times $t_1D$) until the time $t_x$ at which spark ignition occurs. After the times $t_x$ until times $t_{1D}$ the decoder 80 directly couples pules at the rate multiplier output terminal 54 to the main terminal 87.

The terminal 88 of the select decoder 80 is directly coupled as an input to an up-down control (U/D) of the main up-down advance counter 81. The terminal 87 of the select decoder is directly coupled to an input clock terminal (>) of the advance counter 81. A present enable (PE) input terminal of the advance counter 81 directly receives the signal SSp by means of a direct connection to the output terminal 89 of the spark logic circuit 90.

An input reset terminal of the advance counter 81 receives a power on reset signal POR by means of a direct connection to a terminal 91. This power on reset signal is merely utilized to initiate operation of the ignition control system 10 in response to the initial application of power to the ignition control system. This is accomplished by means of a capacitor 92 coupled between the terminal 91 and a power on reset terminal 93 that receives positive power when power is applied to the ignition system control 10. The terminal 91 is coupled to ground through a resistor 94. Thus the components 91 through 94 provide for a positive impulse at terminal 91 upon the first application of power to the power on reset terminal 93, and this is utilized to initiate the resetting of the advance counter 81. The advance counter 81 produces an output at a zero detect terminal 94 and this output is produced whenever the advance counter counts down to or through a count of zero.

Essentially, the auxiliary advance counter 82 is reset at the times $t_1$ by the $S_1$ pulses. The counter 82 then proceeds to count up in accordance with the pulses passed by the rate multiplier 53 and provided at the output terminal 54. This count is registered in the four bit binary output terminals 83 through 86. At the time tx the signal SSp produces a positive spike at the preset enable terminal of the main advance counter 81. This results in instantaneously transferring the count at the output terminals 83 through 86 of the auxiliary advance counter 82 into the main advance counter 81 at the times $t_x$. At this same time the latch signal at the terminal 88 ($S_1L$) is terminated resulting in the up-down control terminal of the advance counter 81 receiving a control input which tells it to count up any subsequently received clock pulses at its clock input terminal. At the times $t_x$, the select decoder 80 now channels the pulses produced at the output terminal 54 of the rate multiplier through the select decoder 80 and its output terminal 87 into the input clock terminal of the advance counter 81. The result of this is that the advance counter 81, after the time $t_x$, essentially acts as if it had continuously counted all of the pulses produced at the terminal 54 since the time $t_1$. The reason that the counter 81 did not directly count all of the clock pulses at the terminal 54 from the time $t_1$ to the time $t_x$ was because the counter was engaged in a down counting operation at that time which determines the occurrence of spark ignition. This will now be explained in detail.

From the time $t_x$ until the next time $t_1$, the advance counter 81 continues to count up all of the pulses produced at the output terminal 54 of the rate multiplier 53. Thus at the next time $t_1$ a maximum count is obtained by the main advance counter 81 which is related to the actual time difference between the periodic occurrence of synchronized advance sensor pulses $S_1$ at the times $t_1$. This means that the maximum count obtained by the counter 81 is related to engine speed and that the ROM 48 and rate multiplier 53 control this relationship in a piecewise linear manner to obtain the correct non-linear relationship between the maximum count in the advance counter 81 and engine speed, as well as the relationship between the maximum count and the sensed engine vacuum pressure.

At the time occurrences $t_1D$, which occur just after each of the synchronized advance pulses $S_1$, the select decoder 80 produces a latched signal $S_1L$ at the terminal 88 which now instructs the advance counter 81 to count down instead of up. Simultaneously, the select decoder 80 now channels the fixed frequency clock pulses $C_3$ to its output terminal 87. The end result is that the main advance counter 81 will now count down at a fixed rate determined by the occurrence of the pulses $C_3$ unitl a zero count is obtained and a zero detect signal is produced at the terminal 94. At this time, this zero detect signal will be received by the spark logic circuit 90 and result in producing the spark occurrence signal SSp which will terminate further down counting, load the count of the auxiliary advance counter 82 into the main counter 81 and initiate the main counter 81 up counting the pulses produced at the terminal 54.

The operation of the components 80 through 82 is probably best understood by referring to FIGS. 10I and 10J. FIG. 10I represents the accumulated count in the auxiliary advance counter 82. This count is essentially the non-linear pulse occurrences which occur at the output terminal 54 of the rate multiplier 53. At the times $t_x$ at which the pulses SSp occur, the count of this counter is directly transferred to the advance counter 81 by means of preset enable circuitry. Preset enable circuitry for counters is very well known and merely results in loading a counter with a preset count in response to an actuation pulse being received at a preset enable terminal.

FIG. 10J illustrates the count in the main advance counter 81. This figure illustrates that at the times $t_1$ a maximum count is obtained by the advance counter 81. Then at times $t_1D$ the counter 81 will count down at the fixed rate determined by the rate occurrence of the signal $C_3$, whereas the up counting of this counter was determined by the ROM 48 and rate multiplier 53 implementing a stepwise rate of increase of pulse counts. U.S. Pat. No. 4,104,997 clearly illustrates how such a stepwise increasing rate combined with a linear decreasing rate will result in accurately determining the spark time occurrence for internal combustion engines so that a proper advance versus engine speed relationship is developed. Since the equations demonstrating this relationship are contained in the referred to issued U.S. patent, they will not be repeated here.

From the foregoing statements it should be evident that the decoder 80 and counters 81 and 82 effectively form an accumulating means for the pulses produced at the output terminal 54 of the rate multiplier 53. At the times $t_1D$, this accumulated count is then linearly decreased at a fixed rate determined by the time occurrence of the pulses $C_3$ until a zero detect signal is produced at the terminal 94. This zero detect signal represents the desired spark timing occurrence, and the spark logic circuit 90 utilizes this signal to produce the signal SSp at the terminal 89 as well as produce a composite signal (dwell/spark) at an output terminal 100 which contains both dwell and spark timing information. This composite signal at the terminal 100 is then coupled to an input terminal 101 of an output predriver 99 which supplies an output at a terminal 102 to a final driver stage 103, in an ignition coil power stage 98 (shown dashed), that controls the excitation of the primary winding 104 of an ignition coil. A high voltage secondary winding 105 of the ignition coil is coupled to the spark gaps of a two cylinder engine to produce ignition pulses therein.

A primary ignition coil current sensing resistor 106 is contemplated as sensing the current through the primary coil 104 and providing a feedback signal at a terminal 107 which is coupled as an input to the output predriver. This is utilized to maintain constant primary ignition coil current excitation in a well known manner. The output pre-driver 99 also receives an input at a terminal 109 related to actual battery voltage magnitude and another input at a terminal 110 related to whether or not an engine stall condition has occurred. If engine stall, abrupt slow crankshaft rotation, has been detected, then the current through the primary coil 104 will be slowly decreased so as to remove energization from this coil without generating a spark until the engine stall condition has been rectified. The battery voltage magnitude signal at the terminal 109 is utilized to alter the ignition coil current driving signal to obtain constant energy spark ignition despite variations in battery voltage. The output pre-driver 99 and the ignition coil power stage 98 are contemplated as comprising standard electronic ignition system components and therefore the details of these components will not be discussed since they do not form part of the present invention.

The spark logic circuit 90 which creates the dwell/spark control signal at terminal 100 receives the master clock pulses $C_p$ from a direct connection to the terminal 26. The circuit 90 also is directly connected to the terminals 34 and 38 for receiving the signals $S_1$ and $S_2$, respectively. The spark logic circuit 90 receives the POR signal at a reset terminal for initiating the logic components contained in the circuit 90 in response to the initial application of power to the electronic ignition control system 10. The circuit 90 also receives the zero detect signal produced at the terminal 94 of the main advance counter 81. In addition, the spark logic 90 also receives a dwell initiation signal by means of a direct connection to an output terminal 120 of a dwell circuit 121, and the circuit 90 also receives a slow speed detect signal from an output terminal 122 of a slow speed decoder 123. In response to all of these inputs the spark logic circuit 90 produces the signal SSp at the terminal 89 wherein the SSp signal is a pulse at $t_x$ which exists for one clock pulse period of the pulses $C_p$. The circuit 90 will also create a combined dwell initiate and spark timing occurrence output signal at the output terminal 100.

Essentially, once the spark logic circuit 90 has been reset by the application of power to the electronic ignition control system 10 by the POR signal, the logic circuit 90 will receive dwell initiate signals from the terminal 120 and spark timing occurrence signals from the terminal 94 for each cycle of cylinder compression. If for some reason a dwell initiating signal has not been received by the spark logic circuit 90 prior to the occurrence of the pulse $S_1$ which is generated at the maximum possible advance point of crankshaft rotation, then the spark logic circuit 90 will initiate dwell at the times $t_1$ corresponding to the occurrence of the pulses $S_1$. Similarly, if for some reason a spark ignition has not occurred by the times $t_2$ at which the pulses $S_2$ occur, then the spark logic 90 will create a spark occurrence at these times. Actually, when the slow speed decoder 23 determines that engine rotating speed is below a predetermined minimum level, the signal at the terminal 122 insures that dwell will be initiated at the times $t_1$ and that spark will occur at the times $t_2$. This provides a dwell equal to 35 degrees of crankshaft rotation for slow speed conditions and provides for spark ignition at essentially top dead center of the cyclinder compression cycle. For engine speeds above this predetermined slow speed, the signal at the terminal 122 allows dwell to be initiated by the signal at the terminal 120 and spark to be determined by the zero detect provided at the terminal 94. The signal produced at the terminal 100 is initiated in response to when dwell is desired to commence ($t_{DW}$) and is terminated in response to when the spark logic 90 determines spark ignition should occur ($t_x$).

A typical embodiment for the spark logic circuit 90 is illustrated in FIG. 7. The power on reset connection has not been shown in FIG. 7 in order to simplify the diagram. All of the components in FIG. 7 correspond to standard logic gate components and flip flop devices.

The engine stall indicating signal produced at the terminal 110 is the output of an engine stall counter 125 which receives a reset input signal by a direct connection to the terminal 34. The counter 125 receives a counting clock input signal by means of an input direct connection to the terminal 47 of the main up counter 41. In this manner, if the stall counter 125 determines that between consecutive times $t_1$ at which the synchronized advance pulses $S_1$ occur, the main up counter 41 has registered a predetermined number of changes in the most significant bit of the counter which is connected to the terminal 47, then the counter 125 will indicate that the count being registered by the main up counter 41 is too high. This indicates that the actual time elapsed between consecutive times $t_1$ is too great thus indicating that the engine has stalled by virtue of the fact that the engine crankshaft is not rotating above a predetermined speed. When this is determined, a stall indicating signal at the terminal 110 will be received by the output pre-driver 99 and result in appropriately modifying the output of the pre-driver to take into account this condition. The internal construction of the stall counter 125 merely consists of a resetable pulse counter which develops an output whenever the pulse count is above a predetermined thresold. Readily available logic circuits can implement such a function.

The slow speed decoder 123 essentially works on a similar principle to the stall counter 125. The slow speed decoder 123 determines with the count in the main up counter 41 exceeds a predetermined maximum count. This accomplished by coupling the terminals 43 through 47 as inputs to the slow speed decoder 123. The decoder 123 is reset at times $t_1D$ via a connection to terminal 40. The decoder also receives the pulses $S_1$ via a direct connection to the terminal 34 and it receives a power on reset pulse via a direct connection to the termainal 91. In response to all of these inputs the decoder 123 produces a slow speed detection at the terminal 122 at times $t_1$ whenever the count of the main counter indicates that the actual time between the $S_1D$ pulses exceeds a predetermined maximum time. Whenever this occurs, this indicates that the engine speed is below a predetermined minimum speed, and the signal at the terminal 122 is received by the spark logic circuit 90 and results in initiating dwell at the times $t_1$ and causing spark ignition to occur at the times $t_2$. Of course the engine speed which actuates the stall counter 125 is an engine speed which is much less than the predetermined engine speed which resulted in actuating the slow speed decoder 123. FIG. 6 illustrates a typical embodiment for the slow speed decoder 123 and the components in FIG. 6 represent standard logic circuit components used for a typical implementation.

Figure 5:
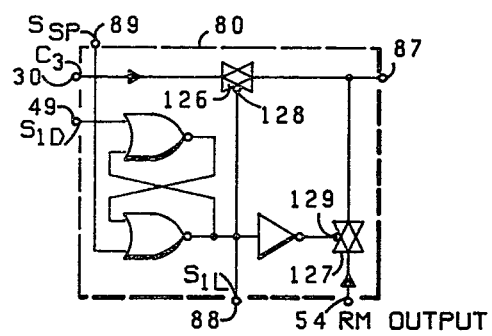
FIG. 5 is a schematic diagram illustrating a typical configuration for a select decoder illustrated in FIG. 1.

It should be noted that FIG. 5 illustrates a typical digital circuit implementation for the select decoder 80. In FIG. 5 controllable gates 126 and 127 are illustrated. These gates operate as selective open or short circuits between there throughput terminals in response to the digital logic signals present at their respective control terminals 128 and 129.

It should also be noted that FIG. 4 illustrates a typical digital circuit implementation for the advance and reference buffers 21 and 22, the pulse synchronizers 33 and 37, the delay circuit 39 and the inhibit circuit 36. Again it should be noted that the logic circuit implementations shown in FIG. 4 comprise standard digital logic circuits.

The inhibit circuit 36, besides producing a four millisecond delay pulse at the terminal 35 in response to receiving a spark ignition signal (SSp) and in response to the received C1 pulses provided as a timing duration input, also provides a two millisecond delay signal after spark ignition at an output terminal 130. The terminal 130 is coupled to the dwell circuit 121 and the two millisecond signal serves to inhibit the operation of the dwell circuit until at least two milliseconds after the occurrence of spark ignition. This is required in order to prevent 100 percent dwell from occurring at very high engine speeds. If 100 percent dwell were to occur then no spark ignition would be permitted since current excitation for the ignition coil primary winding 104 would always be applied.

Essentially the inhibit circuit 36 merely utilizes the signal (SSp) at the times $t_x$ to initiate two different monostable time periods which are provided at the terminals 35 and 130 to implement different delays for circuitry in the electronic spark igntion control system 10. The detailed configuration of the inhibit circuit 36 will not be specifically recited since the embodiment in FIG. 5 is a typical embodiment using standard components and many other embodiments could accomplish this desired function.

Figure 2:
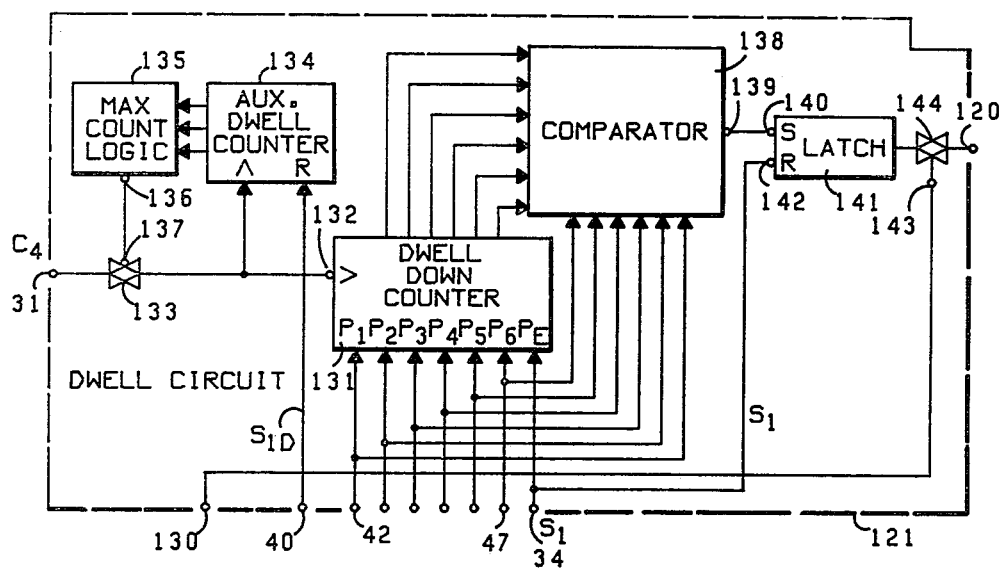
FIG. 2 is a schematic diagram illustrating a typical configuration for a dwell circuit illustrated in FIG. 1.

Typical embodiments for the dwell circuit 121 will now be discussed. A first such typical embodiment 121 is illustrated in FIG. 2 and another embodiment 121' is illustrated in FIG. 8. In FIG. 8 prime notation is utilized to identify substantially similar corresponding components. The specific embodiments of dwell circuit 121 shown in FIGS. 2 and 8 were developed by co-workers of the present inventor and are described in the two copending U.S. applications referred to in "Cross Reference to Related Applications".

In both of the dwell embodiments shown in FIGS. 2 and 8, the dwell circuit 121 (121') receives counter inputs from the main counter output terminals 42 through 47 at preset input terminals $P_1$ through $P_6$ of a dwell down counter 131 (131'). The terminal 34 at which the $S_1$ pulses are produced is directly coupled to a preset enable terminal of the dwell down counter and a counting clock pulse input terminal 132 (132') for the dwell down counter is provided.

For the dwell circuit embodiment illustrated in FIG. 2, the terminal 31 at which the pulses $C_4$ are produced is coupled through a controllable gate 133 to the terminal 132. The terminal 132 is also coupled as a pulse counter input to an auxiliary dwell counter 134 which has a reset terminal directly coupled to the terminal 40 for receiving reset pulses at the times $t_1D$ corresponding to the pulses $S_1D$. The count output of the auxiliary dwell counter 134 is coupled to a maximum count logic circuit 135 which is intended to produce a low output signal at its output terminal 136 in response to the count in the auxiliary dwell counter reaching or exceeding a predetermined maximum count. The terminals 136 is directly connected to a control terminal 137 of the through gate 133. In this manner, the auxiliary dwell counter 134 insures that after the reception of reset pulses $S_1D$, the through gate 133 will pass a precise number of clock pulses as inputs to the input terminal 132 of the dwell down counter 131 and auxiliary counter 134.

At the times $t_1$, the count of the dwell counter 131 is preset to the maximum count obtained by the main counter 41, wherein this maximum count is directly linearly related to engine crankshaft speed. The auxiliary dwell counter 134 and controllable gate 133 effectively result in, subsequently at times $t_1D$, having the dwell down counter 131 rapidly count down a predetermined number of counts from the maximum speed related count obtained by the main counter 41. It should be noted that the rate of down counting occurs at the relatively high repetition frequency of the signal $C_4$, whereas the rate of up counting the main counter 41 occurs at the substantially slower rate of occurrence of the pulses $C_1$. This results in the dwell down counter 131 effectively instantly subtracting (at times $t_1D$) the predetermined number of $C_4$ pulses passed through the controllable gate 133 from the maximum count which was pre-set into the dwell down counter 131 at the times $t_1$ by the synchronized pulses $S_1$.

For the dwell circuit in FIG. 2, the terminals 42 through 47 of the main up counter 41 are also coupled as inputs to a count comparator 138 which also receives the output count of the dwell down counter 131. When the count indicated by the terminals 42 through 47 equals or exceeds the count being held (after down counting has ceased) as the output count of the dwell down counter 131, the comparator 138 will produce a logic signal indicating this condition at an output terminal 139. The terminal 139 is coupled to an input set terminal 140 of a latch device 141. The output of the latch device 141 is coupled through a controllable gate 144 to the output terminal 120 of the dwell circuit 121 and a reset terminal 142 of the latch 141 is directly coupled to the terminal 34 at which the $S_1$ signal is produced. The two millisecond inhibit signal produced at the terminal 130 is coupled to a control terminal 143 of the controllable gate 144.

The dwell circuit shown in FIG. 2 operates as follows. At the time occurrence $t_1$ of the synchronized advance pulses $S_1$, the maximum count in the main counter 41 is preset into the dwell down counter 131. At times $t_1D$ after the maximum count of the main counter 41 is loaded into the dwell down counter 131, the circuitry 132 through 137 has the down counter 131 rapidly count down a predetermined number of counts. Preferably this predetermined number of counts which occur at the high fixed frequency of the pulses $C_4$ will be equivalent to 6 milliseconds of real time as measured by an equivalent number of pulse counts at the frequency of the signal pulses $C_1$.

At the times $t_1D$ after the pre-setting of the dwell down counter 131, the main up counter 41 is reset by the pulses $S_1D$. At approximately this time the dwell down counter 131 will have completed its effective subtraction of a predetermined number of counts from the maximum count preset into the dwell down counter 131. Thus the comparator 138, just after the times $t_1D$, will compare the subtracted output count of the dwell down counter 131 with the newly initiated count of the main up counter 41. Whenever the main up counter count reaches or exceeds the subtracted down count of the dwell counter 131, the comparator 138 will produce a high logic state at its output terminal 139 which will result in setting the latch 141 whose output at the terminal 120 signals the desired initiation of coil excitation (dwell). This mode of operation is essentially illustrated in FIG. 10P wherein the vertical axis represents the count being stored in a counter and the horizontal axis represents time.

Essentially between first and second time occurrences $t_1D$ and $t_1$ the main counter 41 produces a running count by counting the pulses $C_1$ which have an engine speed independent repetition rate. At times $t_1$ a maximum running count related to engine crankshaft rotation speed is loaded into the down counter 131. The down counter then effectively subtracts a predetermined number of $C_4$ pulse counts to arrive at a resultant subtracted count at substantially the time occurrence $t_1$. This resultant subtracted count is then utilized to produce dwell ignition occurrences, preferably at a substantially fixed time duration prior to the next time occurrence of $t_1$.

In FIG. 10P, the count of the dwell counter 131 is illustrated as a solid line whereas the count of the main up counter 41 is illustrated as a dashed line. FIG. 10P illustrates at the times $t_1$ a maximum count is preset into the dwell down counter 131 and then a predetermined number of counts is rapidly subtracted (at times $t_1D$) from this number. Subsequently the dwell counter 131 maintains this subtracted count as its output. At the times $t_1D$, the count in the main counter 41 is set to zero and this counter will commence up counting in response to the pulses $C_1$ resulting in linear incrementing of the count of the counter 41. At a subsequent time $t_{DW}$ the count in the main counter 41 will equal the subtracted count being maintained by the dwell counter 131. At this time $t_{DW}$ the comparator 138 will produce a logic signal that will set the latch 141 and thereby signal the initiation of dwell by the signal produced at the latch output terminal 120. The latch 141 will be reset upon the occurrence of the pulse signal $S_1$.

The controllable gate 144 is utilized to insure that the dwell initiation signal at terminal 120 will not start until at least 2 milliseconds after the occurrence of spark ignition. This insures that 100 percent dwell will not be obtained, and that therefore the primary ignition coil winding 104 will not be constantly excited. This insures the occurrence of a spark for each cylinder when it is in its compression cycle, since if the primary winding always received current excitation no spark could be generated.

FIG. 8 illustrates another embodiment 121' of the dwell circuit which is similar to the embodiment shown in FIG. 2. Identical reference numbers are utilized for identical components and prime notation is used for similar components.

In FIG. 8, output count terminals 42 through 47 of the main counter 41 are connected to preset inputs $P_1$ through $P_6$ of a dwell down counter 131'. A preset enable terminal of the dwell counter 131' is directltly coupled to the terminal 34 such that the counter will be preset in response to the pulses $S_1$. In FIG. 8, a dwell counter overflow terminal is directly connected to a terminal 139' which is coupled to a terminal 140' that is directly connected to the set terminal of a latch 141' having its output connected to the terminal 120 through a controllable gate 144'. A reset terminal of the latch 141' is directly connected to the terminal 34 thus providing for resetting the latch 141' in response to the signal $S_1$. The controllable gate 144' has a control terminal 143' which is directly connected to the terminal 130 such that the controllable gate 144' will implement a minimum 2 millisecond delay after SSp for initiating a dwell signal at terminal 120.

The dwell down counter 131' has a clock input terminal 132' which is coupled through a controllable gate 133' and an OR gate 160' to the terminal 31 at which the pulses $C_4$ are present. An auxiliary dwell counter 134' has a reset terminal directly connected to the terminal 40 and a clock signal input terminal directly connected to an output terminal 159 of gate 133'. The output count of the auxiliary dwell counter 134' is coupled to a maximum count logic circuit 135' which produces an output signal at a terminal 137' whenever the auxiliary dwell counter count equals or exceeds a predetermined count. The terminal 137' is directly connected as a control input terminal to the controllable gate 133', and this terminal is also coupled through an inverter stage to a control input terminal 150' of a controllable gate 151' coupled, together with OR gate 160', between the terminal 132' and the terminal 28 at which the pulses $C_1$ are present. The OR gate 160' permits pulses passed by either of the controllable gates 133' or 151' to reach the terminal 132'.

The operation of the dwell circuit 121' illustrated in FIG. 8 will now be described with reference to the graph shown in FIG. 10Q which essentially illustrates the operation of the dwell circuit 121' by illustrating the count of the dwell down counter 131' as a function of time. At the times $t_1$, the dwell down counter 131' is preset with the maximum count obtained by the main up counter 41. At the subsequent times $t_1D$, the count of the auxiliary dwell counter 134' is set to zero resulting in the controllable gate 133' passing a predetermined number of the rapidly occurring clock pulses $C_4$. After the auxiliary dwell counter has counted this predetermined number of $C_4$ pulses, the maximum count logic circuit 135' will open the controllable gate 133' and result in closing the controllable gate 151'. During this time, the dwell down counter 131' has effectively, instantaneously subtracted this predetermined number of counts from the maximum count which was preset into the dwell counter 131'. Subsequent to this subtraction, the dwell down counter 131' will continue down counting at a rate determined by the occurrence of the pulses $C_1$. It should be noted that this occurrence rate is the same occurrence rate at which the main counter 41 is being linearly incremented up to its maximum count representative of engine crankshaft speed. At a subsequent time $t_{DW}$ the count in the dwell down counter 131' will reach zero and on the next count an overflow indication will be produced at the terminal 139'. This will result in setting the latch 141 and providing a dwell initiation signal at the output terminal 120 assuming at least a two millisecond delay between spark occurrence and dwell initiation.

The dwell circuit in FIG. 8 differs from that in FIG. 2 in that the need for a complex count comparator such as the comparator 138 in FIG. 2 is eliminated by the circuit configuration shown in FIG. 8. This is accomplished by having the dwell down counter 131 continue to count down at a rate determined by the $C_1$ pulses after effectively subtracting a predetermined number of counts occurring at the rapid frequency of the signal $C_4$. In this manner, the output of the dwell down counter 131' will reach zero at predetermined times $t_{DW}$ ahead of the predetermined times $t_1$. This occurs since if no counts were subtracted and engine speed remained the same, then the dwell down count would overflow exactly at times $t_1$. Thus the dwell circuits 121' and 121 insure that dwell initiation will occur at a predetermined time prior to the occurrence of the advance pulses $S_1$ at the times $t_1$. The circuit 121' in FIG. 8 accomplishes this end result without the use of the complex comparator 138 shown in FIG. 2 and therefore is believed to be more economical since fewer connecting lines and logic gates are required for the circuit 121'.

While I have shown and described several embodiments for the present invention, further improvements and modifications will occur to those of skill in the art. All such modifications which retain the basic underlying principles disclosed and claimed herein are within the scope of this invention.

I claim:

1. A digital signal processing circuit comprising:
   clock means for producing an input clock signal comprising a series of digital pulses having a predetermined rate of occurrence;
   rate multiplier means coupled to said clock means for receiving said input signal and producing a corresponding output signal by selectively multiplying (dividing) the rate occurrence of the input clock signal pulses in accordance with received control signals;
   control means coupled to said rate multiplier means for producing and supplying said control signals for controlling the rate multiplication of said rate multiplier means, said control means comprising a read only memory means (ROM) with the output of the ROM determining said control signals;
   accumulator means coupled to said rate multiplier means for receiving said output signal and accumulating a count related to the pulse count of said output signal;
   wherein the improvement comprises said control means including,
   pulse width modulation means for receiving an analog signal and producing a periodic digital two state signal having a duty cycle related to the magnitude of the analog signal, and
   means coupling said digital two state signal as an input to said ROM, in addition to other inputs received by said ROM, whereby the output of said ROM, which comprises said control signals, is a function of the magnitude of said analog signal, thereby causing the rate of occurrence of pulses in the output signal of the rate multiplier means to be a function of the magnitude of the analog signal while minimizing the memory storage required by said ROM and effectively causing the digital signal processing circuit to interpolate between rate multiplier means control signals stored by said ROM while minimizing the memory storage required by said ROM.

2. A digital signal processing circuit according to claim 1 which includes periodic signal means for producing predetermined periodic signal pulses, said periodic signal pulses coupled to said accumulator means for periodically resetting the count of said accumulator means.

3. A digital signal processing circuit according to claim 2 wherein said control means includes counter means for developing a count during times related to the period of said periodic signal pulses, said counter counter effectively being reset in response to each occurrence of a periodic signal pulse, the count of said counter means determining control signal inputs to said ROM means in addition to the control input determined by said pulse width modulation means.

4. A digital signal processing circuit according to claim 3 wherein the count in said counter means is linearly and periodically incremented during the time between said periodic signal pulses.

5. A digital signal processing circuit according to claims 3 or 4 wherein the period of said pulse width modulation means digital two state signal is substantially greater than the time between said counter means changing control input signals to said ROM means, whereby the rate multiplier means is able to complete passing signals at several different counter means controlled input signals before said pulse width modulation means causes an altering of a ROM input control signal.

6. A digital signal processing circuit according to claim 5 wherein said pulse width modulation period is directly proportional to the period at which the count of said counter means is linearly incremented at.

7. An electronic ignition control system comprising:
   engine crankshaft position sensor means for developing periodic pulses related to engine crankshaft positions;
   digital signal processing circuit means comprising,
   clock means for producing an input signal comprising a series of digital pulses having a predetermined rate of occurrence,
   rate multiplier means coupled to said clock means for receiving said input signal and producing a corresponding output signal by selectively multiplying (dividing) the rate occurrence of the input signal pulses in accordance with received control signals,
   control means coupled to said rate multiplier means for producing and supplying said control signals for controlling the rate multiplication of said rate multiplier means, said control means comprising a read only memory means (ROM) with the output of the ROM determining said control signals, and
   accumulator means coupled to said rate multiplier means for receiving said output signal and accumulating a count related to the pulse count of said output signal, between said periodic crankshaft position pulses; and
   spark timing means for utilizing the accumulated count in said accumulator means to determine the occurrence of spark ignitions;
   wherein the improvement comprises said control means including,
   pulse width modulation means for receiving an analog signal and producing a periodic digital two state signal having a duty cycle related to the magnitude of the analog signal; and means coupling said digital two state signal as an input to said ROM, in addition to other inputs received by said ROM, whereby said pulse width modulation means effectively allows interpolation between rate multiplier means control signals stored by said ROM while minimizing the memory storage required by said ROM.

8. An electronic ignition control system according to claim 7 which includes vacuum sensor means for producing said analog signal wherein the magnitude of said analog signal is related to the sensed engine vacuum pressure.

9. An electronic ignition control system according to claims 7 or 8 wherein said engine crankshaft position sensor means includes two separate sensors, a first sensor producing periodic pulses at the earliest possible time occurrence of desired spark ignitions and a second sensor producing periodic pulses at the latest possible time occurrence of desired spark ignitions.

10. An electronic ignition system according to claim 9 which includes spark logic circuitry means for initiating coil excitation (dwell) at the time occurrence of pulses produced by said first sensor if dwell has not been previously initiated, and for initiating spark ignitions at the time occurrence of pulses produced by said second sensor if spark initiation has not been previously initiated between the occurrence of said first and second sensor pulses.

11. An electronic ignition control system according to claim 9 wherein said periodic first sensor signal pulses are effectively coupled to said accumulator means for periodically resetting the count of said accumulator means.

12. An electronic ignition control system according to claim 11 wherein said control means includes counter means for developing a count during times related to the period of said periodic first sensor signal pulses, said counter count effectively being reset in response to each occurrence of a periodic first sensor signal pulse, the count of said counter means determining control signal inputs to said ROM means in addition to the control input determined by said pulse width modulation means.

13. An electronic ignition control system according to claim 12 wherein the count in said counter means is linearly and periodically incremented during the time between said periodic first sensor signal pulses.

14. An electronic ignition control system according to claim 12 wherein the period of said pulse width modulation means digital two state signal is substantially greater than the time between said counter means changing control input signals to said ROM means, whereby the rate multiplier means is able to complete passing signal at several different counter means controlled input signals before said pulse width modulation means causes an altering of a ROM input control signal.

15. An electronic ignition control system according to claim 14 wherein said pulse width modulation period is directly proportional to the period at which the count of said counter means is linearly incremented at.

* * * * *